US005787583A

United States Patent [19]

Wolf et al.

[11] Patent Number: 5,787,583

[45] Date of Patent: Aug. 4, 1998

[54] APPARATUS AND METHOD FOR SETTING A VALVE LIFT

[75] Inventors: Guenther Wolf, Renningen; Meinrad Feder, Leonberg; Uwe Dowedeit, Ebersbach; Volker Hartmann, Ellwangen; Karl-Heinz Pfrommer, Muehlacker; Markus Roerig, Leonberg; Iris Wislicenus, Erlangen, all of Germany

[73] Assignee: Robert Bosch GmbH, Stuttgart, Germany

[21] Appl. No.: 591,483

[22] PCT Filed: Apr. 29, 1995

[86] PCT No.: PCT/DE95/00576

§ 371 Date: Jan. 11, 1996

§ 102(e) Date: Jan. 11, 1996

[87] PCT Pub. No.: WO95/30830

PCT Pub. Date: Nov. 16, 1995

[30] Foreign Application Priority Data

| | | | |
|---|---|---|---|
| May 10, 1994 | [DE] | Germany | 44 16 492.0 |
| Apr. 1, 1995 | [DE] | Germany | 95 12 338.7 |

[51] Int. Cl.[6] ...... B23P 15/00

[52] U.S. Cl. ...... 29/888.03; 29/888.44; 29/407.08

[58] Field of Search ...... 29/888.44, 888.03, 29/407.08, 888.4

[56] References Cited

FOREIGN PATENT DOCUMENTS

| | | | |
|---|---|---|---|
| 0216010 | 4/1987 | European Pat. Off. . | |
| 4026721 | 2/1992 | Germany . | |
| 2058466 | 4/1981 | United Kingdom . | |
| 2082292 | 3/1982 | United Kingdom . | |
| WO 94/00686 | 1/1994 | WIPO | 29/888.4 |

*Primary Examiner*—Erick R. Solis
*Attorney, Agent, or Firm*—Spencer & Frank

[57] ABSTRACT

An apparatus and a method are proposed for adjusting a valve lift, particularly a valve needle lift of an injection valve of an internal combustion engine, wherein a valve seat, which is preset in a housing of the valve (20), is axially displaceable in the housing by means of plastic deformation. The apparatus is provided with an adjustment device (50) which generates a feeding motion for a pressing tool (53, 55) in the direction of the plastic deformation and with a measuring device (30) which determines the valve lift that is changeable by way of the plastic deformation of the valve seat and compares the valve lift with a preset desired value, with the adjustment device (50) being controllable by way of the desired value/actual value comparison. The pressing tool (53, 55) is fed by means of a first and, if necessary, by means of at least one further feeding process. From the values obtained by the first feeding process a characteristic is formed during a learning phase, from which a further feed for the respective further feeding process is determined.

15 Claims, 5 Drawing Sheets

APPARATUS AND METHOD FOR SETTING A VALVE LIFT

PRIOR ART

The invention relates to an apparatus and a method for setting a valve lift, in particular a valve needle lift of an injection valve of an internal combustion engine of the generic type of the respective independent claims.

An injection valve according to DE-A1 40 26 721 has a valve seat body in a valve housing, with the valve seat body being connected to an apertured body which is fixed with respect to the housing. A valve needle with a valve closing body is seated on the valve seat body. The precise setting of the valve needle lift takes place on the completely assembled injection valve by plastically deforming the apertured body, which is fixed with respect to the housing, in the direction of the valve closing body. The deformation of the apertured body reduces the valve needle lift from a preset magnitude to a required valve lift. The valve needle lift defines the static flow volume of the injection valve.

An efficient valve production requires that the integration of the setting of the valve lift into an assembly line production process be possible. This also means that it must be possible to set the valve lift with a high degree of repeating accuracy.

ADVANTAGE OF HE INVENTION

The apparatus having the characterizing features of claim 1 has the advantage that a shifting of the valve seat is possible with a high degree of repeating accuracy by means of plastic deformation of the apertured body at a high feeding speed of the pressing punch. In this manner a cycle time is reached for the setting of the valve lift which allows an integration into an assembly line production process. The method according to the invention is based on a self-learning setting sequence for the setting of the lift and is comprised of a learning phase and a final lift-setting phase. Due to the optimization of the parameters achievable in this manner, highest quality is accomplished at a cycle time which is as short as possible. Furthermore, it is also possible to use this method for different types of valves by editing the parameters.

The measures listed in the dependent claims allow advantageous modifications and improvements of the apparatus according to the invention. It is especially advantageous to implement the force admission via a spring element. In this process, the spring element acts as transmission and allows for a fast feeding speed of the adjustment device. The arrangement of a force sensor in the force transmission chain allows a good approach point recognition so that, in addition, a relatively high approach speed is possible. A high-resolution path measuring system is seated on the valve and can be displaced vertically so that the effects of elasticities of the apparatus can be eliminated. A special clamping arrangement ensures that the valve orients itself freely according to an infeed plane surface and thus is given a defined position.

DRAWING

Figure 1:
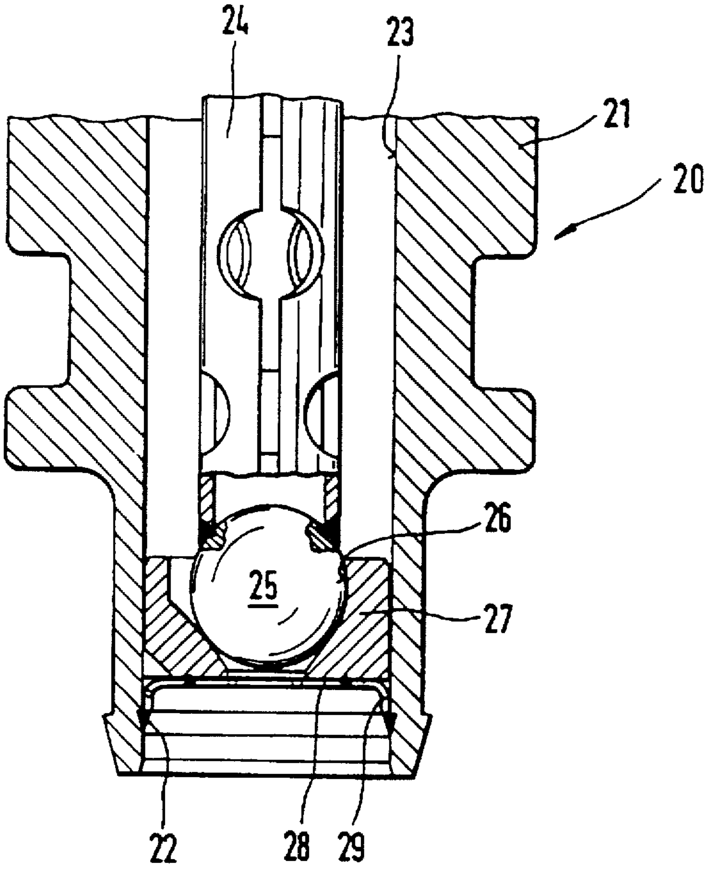

In the following, the invention is described in greater detail by way of an embodiment which is shown in the drawing. FIG. 1 shows a cross section of a nozzle-side end of an internal combustion injection valve, FIG. 2 a fundamental representation of a side view of the apparatus according to the invention, FIG. 3 a sectional representation according to the lines III—III pursuant to FIG. 2, FIG. 4*a* a first section of a process sequence schedule to determine a valve lift during setting and FIG. 4*b* a second section of the process sequence schedule according to FIG. 4*a*.

EMBODIMENT

The injection valve 20, whose nozzle-end section is partially shown in FIG. 1, has a tubular seat support 21 with a longitudinal opening 23 in which, for example, a tubular valve needle 24 is arranged which rests with a spherical valve closing body 25 in a guide opening 26 of a valve seat body 27. The valve seat body 27 is concentrically and fixedly welded to an apertured body 28 at the end face facing away from the valve closing body 25. The apertured body 22 has a pot-shaped cross section having a circumferential retaining edge 29. In the longitudinal opening 23, the apertured body 28 is connected with the retaining edge to the wall of the longitudinal opening 23, for example, by way of a circumferential and tight weld seam 22. The position of the valve seat body 27 in the longitudinal opening 23 fixed by the welding of the apertured body 28 determines a presetting of the valve lift of the valve needle 24. More detailed explanations regarding the structure and effect of the injection valve can be taken from DE-A1 40 26 721.

Figure 2:
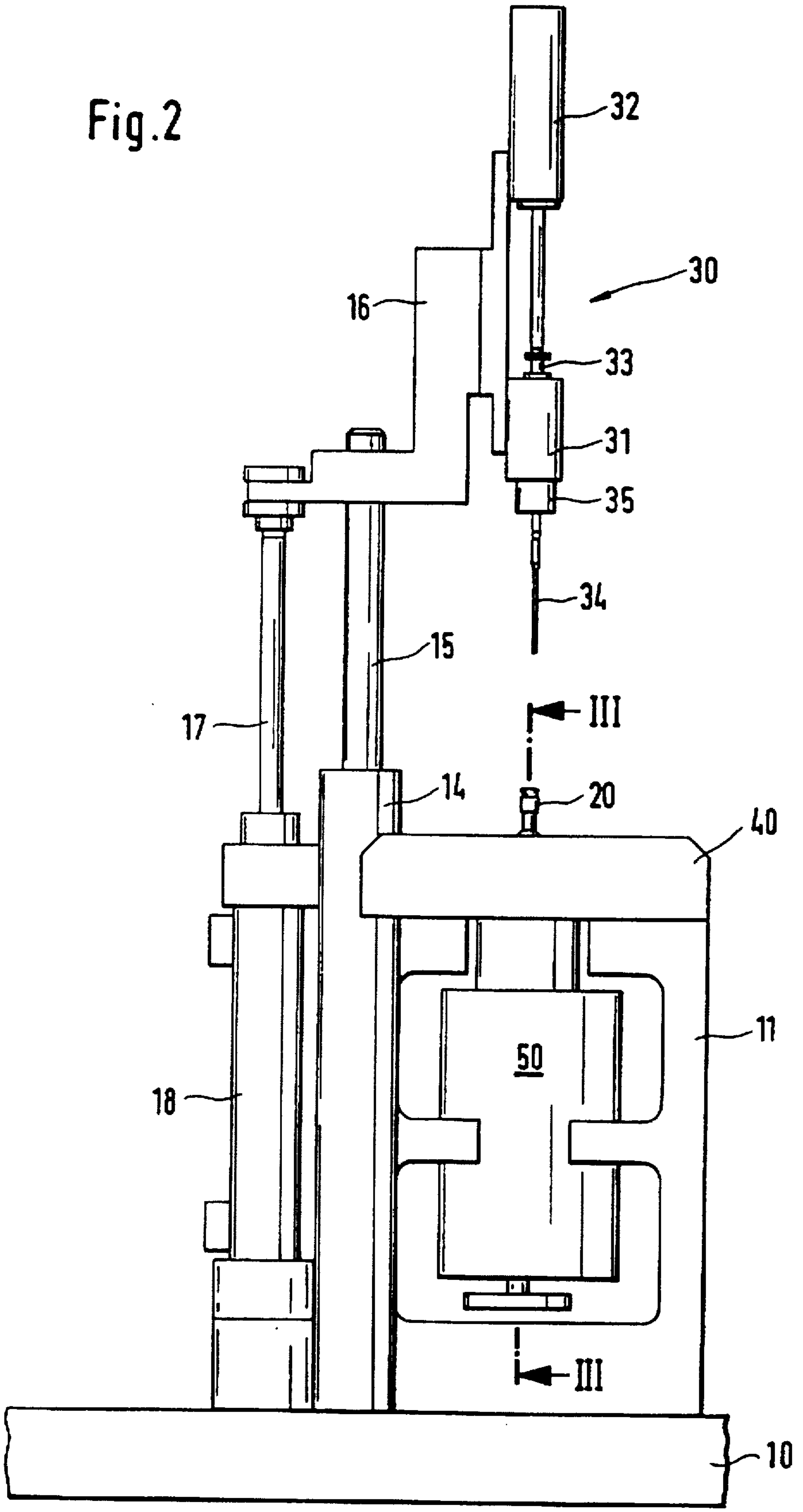

The fundamental representation of the apparatus according to the invention pursuant to FIG. 2 shows a solid frame 11 mounted on a base plate 10, a measuring device 30, a clamping device 40 fastened to the frame 11, and an adjustment device 50. A column guide 14 is mounted to the frame 11 or to the base plate 10 by means of a guide bar 15. The guide bar 15 is connected to an extension arm 16 to which the measuring device 30 is affixed. Furthermore, a piston bar 17 of a pneumatic control cylinder 18 acts on the extension arm 16. An injection valve 20 is clamped in the center and from the bottom to the top in the clamping device 40.

The measuring device 30 is a high-resolution measuring system and is provided with a probe measuring device 31 which acts on a path sensing element 32. The probe measuring device 31 is provided with a measuring carriage 33 with a measuring gage 34, guided in a high-precision ball guide which is not shown, with the measuring gage 34 being comprised of hard metal. The path sensing element 32 is fixedly connected to the measuring carriage 33. A replaceable stop 35 is attached to the housing of the probe measuring device 31; the stop paths for different injection valves can be defined by means of the stop.

The measuring device 30 is fed by the feeding cylinder 18 such that the measuring gage 34 extends through the hollow valve needle 24 and is seated on the valve closing body 25. Afterwards, the stop 35 rests on the housing 21 of the injection valve. The path sensing element 32 supplies an electrical measuring signal which serves to detect the valve lift and is evaluated by the control for the setting process. A light barrier is provided to monitor the running-on of the measuring gage 34; if activated, the light barrier causes the feeding cylinder 18 to return the measuring device 30 into the initial upper position.

Figure 3:
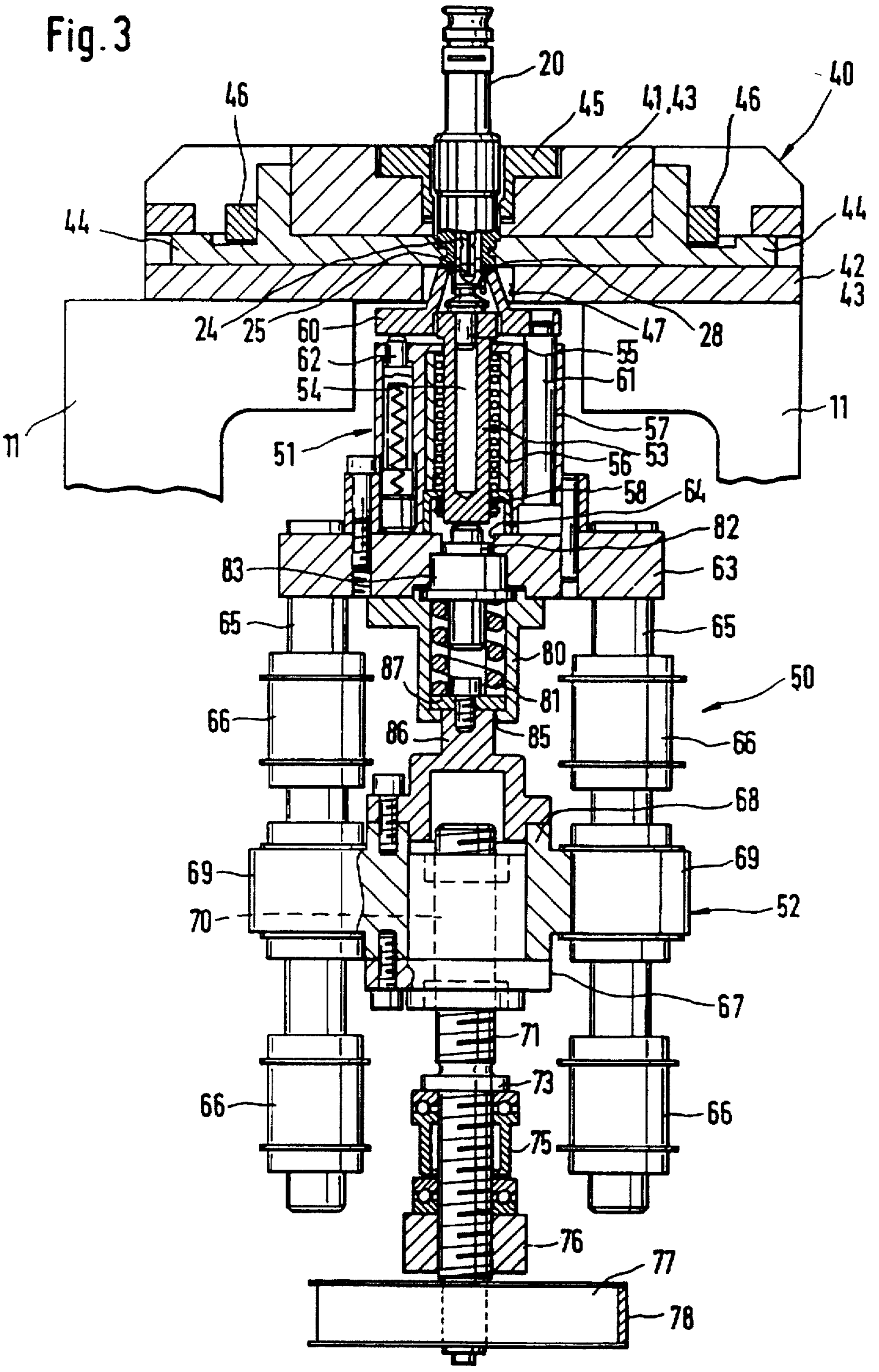

The configuration of the clamping device 40 and of the adjustment device 50 is shown in FIG. 3. The clamping device 40 is comprised of a solid support 43 having a top section 41 and a bottom section 42. A horizontally displaceable centering slide 44 comprised, for example, of two parts is arranged between the support sections 41 and 42, with the centering slide, while having an axial play, clamping the injection valve 20 at an undercut. For the guiding of the slide 44 without any play, a ball detent which is not shown is provided in the bottom support section 42. A receiver 45 having center bores for the injection valve 20 which are not shown is embedded in the top support section 41. The centering slide 44 is displaced axially, for example, by actuating elements 46 which are not shown in detail, with the movement being carried out by pneumatic cylinders which are not shown in detail. The bottom support section 42 has a recess 47 through which extends the nozzleside end of the injection valve 20.

The adjustment device 50 with a pressing unit 51 and a feeding unit 52 is arranged below the support 40. The pressing unit 51 is provided with a pressing mandrel 53 having a central bore 54 into which a pressing punch 55 is inserted. The pressing mandrel 53 is seated, for example, in a ball guide 56 in a low-friction manner, with the ball guide 56 being received in a base body 57. The pressing mandrel 53 is provided with an elastic ring 58 on the side of the adjustment device, which ring pushes the ball cage in its relaxed state back into the working position so that during the pressing process only rolling friction and no sliding friction occurs.

A pressing bell 60 is disposed between base body 57 and injection valve 20, the bell being connected with the base body 57, for example, via two guide pins 61, with the guide pins 61 being seated so as to be axially displaceable within the base body 57. For example, four spring-biased pins 62 project from the end face of the base body 57 on the injection valve side which act on the pressing bell 60 and press the b ell to the injection valve 20 from the bottom by means of the spring force so that the axial clamping play of the injection valve 20 in the centering slide 44 is eliminated.

The base body 57 is screwed to a yoke 63 which carries two guide bars 65 to the feeding unit 52. The two guide bars 65 are each supported in two guide sleeves 66 which are attached to the frame 11. Furthermore, an advance unit 67 is also guided by the guide bars 65; in the present embodiment, the advance unit is a ball screw drive. The advance unit 67 is provided with two further sleeves 69 which are connected to a housing 68, which sleeves implement the guidance of the advance unit 67 on the guide bars 66. The housing 68 comprises a thread nut 70 in which a threaded spindle 71 is guided. The threaded spindle 71 has a shaft, with a collar 73 being secured to it. The collar 73 is supported against an axial/radial bearing 75 which rests on a support 76 which is fixed with respect to the frame 11. On the threaded spindle 71 is seated a belt disk 77 which is connected to a stepping motor which is not shown via a toothed belt 78.

On the drive side, a pot-shaped receiver 80 for a helical spring 81 is seated on the yoke 63. The yoke 63 has an opening 64 which is disposed coaxially with respect to the pressing mandrel 53, with a sleeve 83 having a force sensor 82 positioned in the opening. The sleeve 83 comprises an overload protection. In the drive-side bottom, the pot-shaped receiver 80 is provided with a leadthrough 85 through which extends a cylinder-shaped attachment 86 of the housing 68 and to which end face a thrust plate 87 is secured on which a helical spring 81 is seated.

The adjustment path of the pressing mandrel 53 is generated by the advance unit 67, during which process the generated pressing force is transmitted via the helical spring 81 and the force sensor 82 to the pressing mandrel 53. The force sensor 82 serves to recognize the approach point of the pressing punch 55 on the apertured body 28 of the injection valve 20. Furthermore, the force sensor 82 serves to monitor the force values during the setting process.

The described apparatus works as follows:

An injection valve 20 is placed into the receiver 45 of the clamping device 40 and is clamped by means of the centering slide 44. Following the actuation of the centering slide 44, the adjustment unit 50 is guided to the nozzle-side end of the injection valve 20. This is done by actuating the stepping motor which is not shown, which causes the advance unit 67 to feed the pressing unit 51, while being force-monitored by the force sensor 82, until the pressing punch 55 rests against the apertured body 28 of the injection valve 20. This simultaneously presses the injection valve 20 against the centering slide 44 of the clamping device 40 via the leading, spring-biased pressing bell 60. In this manner it is ensured that the injection valve 20 orients itself according to the infeed plane surface and is held by the centering slide 44 without axial play.

The feeding cylinder 18 now feeds the measuring device 30 until the stop 35 is seated on the injection valve 20 and the measuring gage 34 rests on the valve closing body 25. Simultaneously with the feeding of the measuring device 30, the magnetic circuit of the injection valve 20 is contacted. After registering the lower position of the valve closing body 25, the measuring gage 34 is lifted off the valve closing body 25 and the magnetic circuit of the injection valve 20 is activated. This actuates the valve needle 24 and the valve closing body 25 is lifted off the valve seat body 27. In this position of the valve closing body 25 the measuring gage 34 is again placed on the valve closing body 25 and the path sensing element 32 is set to zero. By removing the voltage for the magnetic circuit, the valve closing body 25 falls back into the initial position. In this manner the actual lift of the valve needle 24 is determined.

Then the stepping motor which is not shown actuates the advance unit 67 during which process the advance motion is picked up by the helical spring 81 which acts as an energy store. On the basis of the spring characteristic of the helical spring 81, the force stored in the helical spring 81 due to the feeding motion of the advance unit 67 is transmitted via the force sensor 82 to the pressing mandrel 53 and the pressing punch 55 to the apertured body 28, with the apertured body being plastically deformed due to the acting force of, for example, 1600 to 1700 Newton at maximum. In this process the pressure spring 81 acts as transmission and allows a fast startup and feeding speed of the feeding unit 52.

Figure 4A:
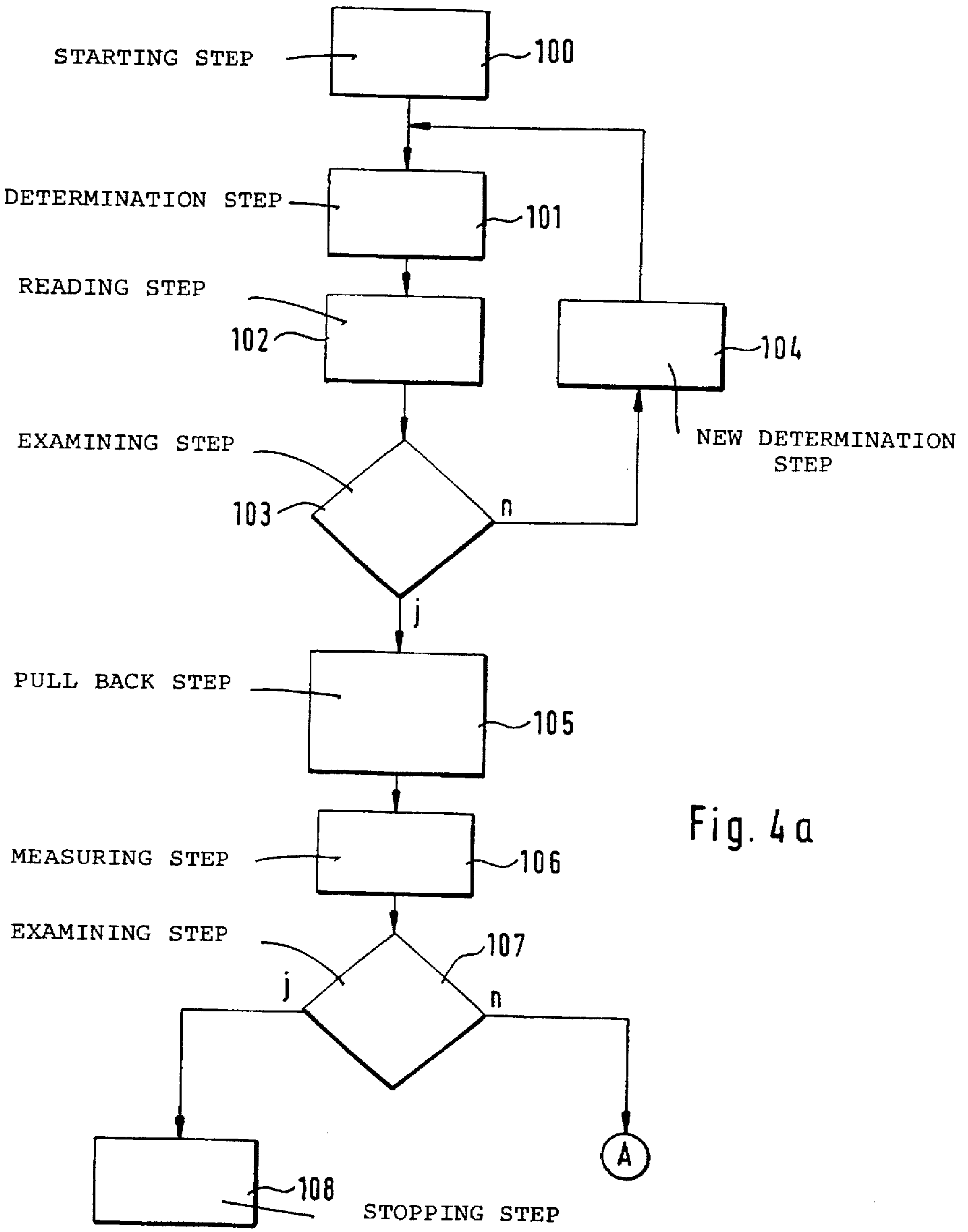
Figure 4B:
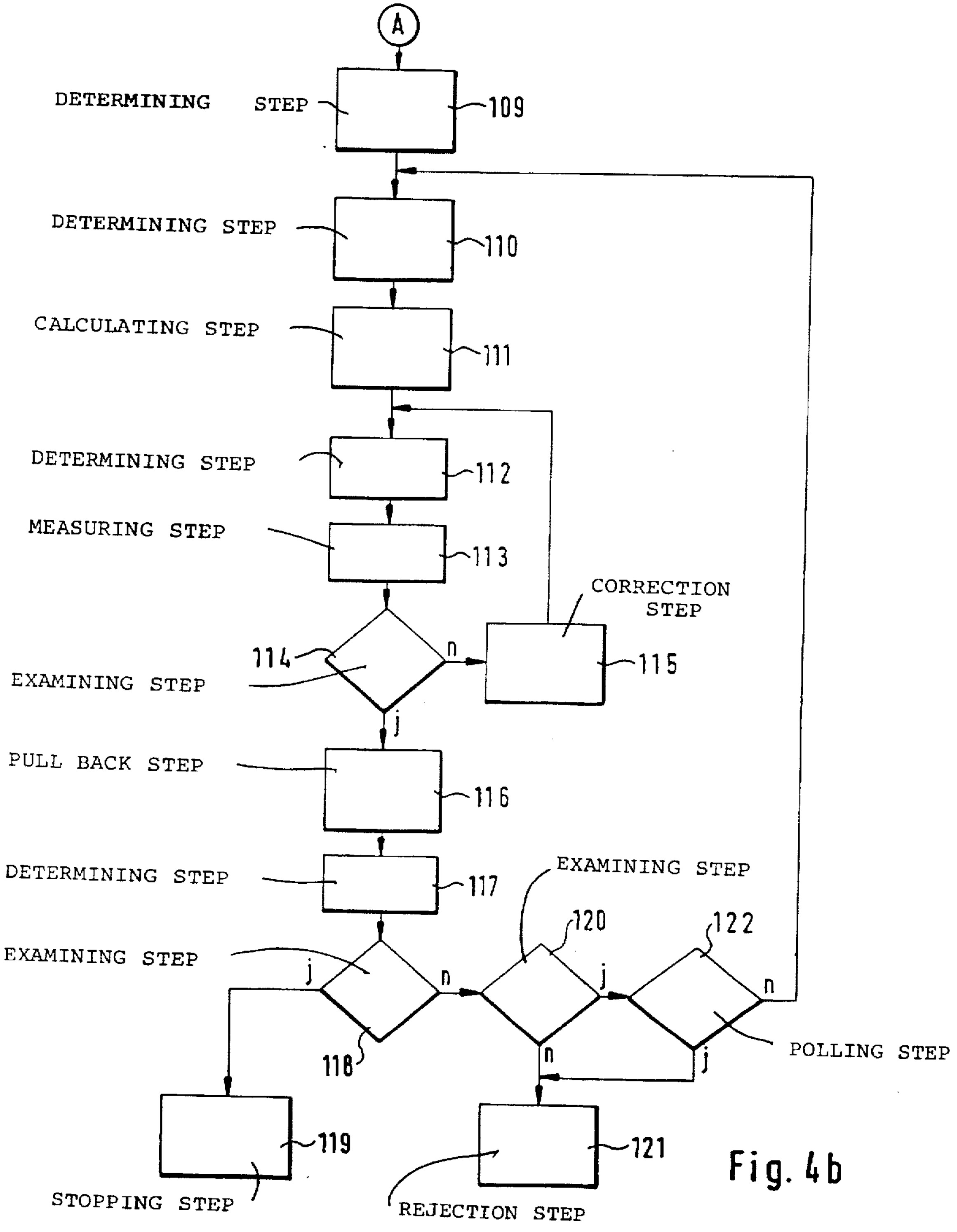

FIGS. 4*a* and 4*b* show a process sequence schedule for determining the feeding path of the pressing punch 55 which is to be executed by the adjustment device 50 for the setting of the valve lift of the injection valve 20. By way of the preset actual lift of the valve needle 24 and the desired set lift, the feeding path is detected as desired difference. At the outset of the pressing process, a starting step number for the stepping motor is determined according to step 100 by means of the desired difference as feed for the pressing punch 55. Then the determined step number is fed in step 101 and the feeding path thus obtained is read in according to step 102. The subsequent step 103 then examines whether the target value of the feeding path has been reached. If the target value has not been reached, a new step number is determined according to step 104 and the feeding path realized with this step number is measured again. Steps 101 to 104 are repeated until the target value according to step 103 is reached. Thus steps 101 to 104 represent a learning phase.

Once the target value is reached, the pressing punch 55 is pulled back (step 105). During this process the apertured body 28 is relieved, which causes the apertured body 28 to spring back because of the portion of the elastic deformation. In this position the lift of the valve needle 24 is measured again according to step 106 and according to step 107 it is examined whether the lift is within a preset tolerance. If the lift is within the preset tolerance, the pressing process is stopped (step 108). If the lift is not within the preset tolerance, a computer unit which is not shown determines a characteristic according to step 109 by way of the values realized with the first feeding process. The characteristic is not linear and has a different course for each injection valve, with the course being a function of several factors, for example, of the initial lift, the inclined position of the apertured body 28, of differences in material and geometry of the apertured body 28 as well as of the spring-back path and the elasticity which may vary due to the welding of the apertured body 28. By way of the characteristic determined in step 109, the step number for a second feeding process necessary to accomplish the desired valve lift is determined in step 110 and the desired feeding path is calculated as a second target value in step 111. Subsequently, the stepping motor is fed with the step number determined from the characteristic (step 112) and the feeding path is measured again (step 113). Step 114 examines whether the measured feeding path has reached the new target value of the desired feeding path. If the condition according to step 114 is not met, a correction step number is calculated according to step 115 and steps 112, 113, 114 and 115 are repeated until the condition according to step 114 is met.

In step 116 the pressing punch 55 is again pulled back and thus the apertured body 28 is relieved. In the relieved state, the valve needle lift is again determined by the measuring device 30 (step 117). It is examined according to step 118 if the valve needle lift is within the tolerance range. If the tolerance range is reached, the pressing process is stopped (step 119).

If the determined valve needle lift is not within the tolerance, it is examined in step 120 whether the valve needle lift is still too large. If the condition according to step 120 is not met, the valve lift already falls short of the desired valve lift and the injection valve is rejected according to step 121. If, however, the lift is still too large, the number of feeding processes is polled in step 122. If, for example, feeding took place three times already, the injection valve is rejected as well according to step 121. If less than three feeding processes have been executed, the program returns to step 110 and a step number and a further target value for a feeding path of a third feeding process are again determined from the characteristic. Steps 111 to 122 repeat themselves accordingly.

The method is not limited to setting the valve lift of injection valves. It can be applied to all lift settings in which at least one lift limitation is set by way of deformation.

We claim:

1. An apparatus for adjusting a valve lift, particularly a valve needle lift of an injection valve of an internal combustion engine, by means of which a valve seat, which is preset in a housing of the valve, is axially displaceable in the housing by means of plastic deformation, characterized in that an adjustment device (50) is provided which generates a feeding motion for a pressing tool (53, 55) in the direction of the plastic deformation and that a measuring device (30) is arranged which determines the valve lift which is changeable by way of the plastic deformation of the valve seat and compares the valve lift with a preset desired value, and that the adjustment device (50) can be controlled by way of the desired value/actual value comparison.

2. An apparatus according to claim 1, characterized in that a spring element (81) is arranged between adjustment device and pressing tool (53, 55) which spring element transforms the feeding motion into a force for the pressing tool (53, 55) by utilizing an elastic form change.

3. An apparatus according to claim 2, characterized in that the spring element (81) is a pressure spring.

4. An apparatus according to claim 1, characterized in that a force sensor (82) is arranged between adjustment device (50) and pressing tool (53, 55) by means of which force sensor the stop of the pressing tool (53, 55) at the valve seat can be determined by means of a reliable, set initial force.

5. An apparatus according to claim 1, characterized in that the adjustment device (50) comprises a pressing unit (51) and a feeding unit (52), that the pressing unit (51) is provided with a low-friction guide (56) for the pressing tool (53, 55), and that the feeding unit (52) is embodied as a ball screw drive (67) which generates the feeding motion.

6. An apparatus according to claim 5, characterized in that the ball screw drive (52) is guided by a guide (65, 66) which is held on a base body (11) and that the ball screw drive (52) can be driven by a stepping motor.

7. An apparatus according to claim 1, characterized in that a clamping device (40) is provided which clamps the valve (20) by means of a centering slide (44).

8. An apparatus according to claim 7, characterized in that the valve (20) can be clamped by the centering slide 44 while having an axial play and that the adjustment device (50) is provided with a work receiving attachment (60) acting on the valve (20), which attachment overcomes the axial play caused by the centering slide (44) by means of a clamping force which axially acts on the valve (20).

9. An apparatus according to claim 8, characterized in that the work receiving attachment (60) is seated on the adjustment device (50) so as to be spring-biased such that the spring force generates the axial clamping force.

10. A method for setting a valve lift, particularly a valve needle lift of an injection valve, wherein by means of a pressing tool a preset valve seat is axially adjusted by plastic deformation, characterized in that the pressing tool is fed by way of a first feeding process and that, based on the values realized during the first feeding process, a characteristic is formed from which a further feed for at least one further feeding process is determined.

11. A method according to claim 10, characterized in that the characteristic is determined from at least two successive feeds and from the feeding path realized thereby during the first feeding process.

12. A method according to claim 10, characterized in that the further feed is determined from the characteristic and the momentary valve lift.

13. A method according to claim 12, characterized in that the momentary valve lift is determined in the relieved state of the valve seat.

14. A method according to claim 10, characterized in that a step number of a stepping motor is used as feed.

15. A method according to claim 10, characterized in that, after the first feeding process, the deformation of the valve seat is stopped if the valve lift has already been reached by means of this feeding process.

* * * * *